(12) United States Patent
Lusted et al.

(10) Patent No.: US 9,252,968 B2
(45) Date of Patent: Feb. 2, 2016

(54) LINK TRAINING AND TRAINING FRAME FOR 100GBPS ETHERNET

(75) Inventors: Kent C. Lusted, Aloha, OR (US); Adee O. Ran, Maayan Baruch (IL)

(73) Assignee: Intel Corporation, Santa Clara, CA (US)

(*) Notice: Subject to any disclaimer, the term of this patent is extended or adjusted under 35 U.S.C. 154(b) by 686 days.

(21) Appl. No.: 13/531,145

(22) Filed: Jun. 22, 2012

(65) Prior Publication Data

US 2013/0343400 A1 Dec. 26, 2013

(51) Int. Cl.
*H04L 12/28* (2006.01)
*H04L 12/413* (2006.01)
*H04L 1/00* (2006.01)

(52) U.S. Cl.
CPC .............. *H04L 12/413* (2013.01); *H04L 1/0041* (2013.01); *H04L 1/0061* (2013.01); *H04L 1/0072* (2013.01)

(58) Field of Classification Search
None
See application file for complete search history.

(56) References Cited

U.S. PATENT DOCUMENTS

| | | | | | |
|---|---|---|---|---|---|
| 3,882,494 | A | * | 5/1975 | Bolger | G01S 13/52 340/554 |
| 4,158,193 | A | * | 6/1979 | D'Antonio | H04L 1/241 714/707 |
| 8,259,760 | B2 | * | 9/2012 | Chiabrera | H04J 3/0629 370/535 |
| 8,307,265 | B2 | * | 11/2012 | Ganga | H03M 13/05 370/470 |
| 8,665,929 | B1 | * | 3/2014 | Lida | H04J 3/0641 327/147 |
| 2003/0194016 | A1 | | 10/2003 | Gorecki et al. | |
| 2003/0207675 | A1 | * | 11/2003 | Hughes | H03G 3/3068 455/234.1 |
| 2005/0135413 | A1 | | 6/2005 | Yang et al. | |
| 2005/0141633 | A1 | * | 6/2005 | Lu | H04L 25/4915 375/292 |
| 2007/0076722 | A1 | * | 4/2007 | Ungerboeck | H04L 12/403 370/395.2 |
| 2008/0165888 | A1 | | 7/2008 | Wiggins et al. | |
| 2009/0187778 | A1 | * | 7/2009 | Diab | G06F 1/3209 713/322 |
| 2009/0219978 | A1 | * | 9/2009 | Mobin | H04L 25/03006 375/219 |

(Continued)

FOREIGN PATENT DOCUMENTS

| | | | | |
|---|---|---|---|---|
| WO | WO 2007133937 A2 | * | 11/2007 | H03M 13/09 |
| WO | 2013/191912 A1 | | 12/2013 | |

OTHER PUBLICATIONS

International Search Report and Written Opinion received for PCT Patent Application No. PCT/US2013/044369, mailed on Sep. 5, 2013, 11 pages.

(Continued)

*Primary Examiner* — Kwang B Yao
*Assistant Examiner* — Hardikkumar Patel
(74) *Attorney, Agent, or Firm* — Law Office of R. Alan Burnett, P.S

(57) ABSTRACT

Methods, apparatus and systems for implementing link training for next-generation high-speed Ethernet links including a 100 Gbps Ethernet link. Training frames are transmitted from a transmit port to be received at a receive port, with each training frame comprising a frame marker portion, a control channel portion, and a training pattern portion. Four-level signaling including a low level signal, first and second intermediate level signals, and a high level signal is implemented for the training pattern portion of the training frame using a pseudo-random bit pattern, while only the low and high level signals are employed for the frame marker and control channel portions of the training frame. The four-level signaling may employ PAM4 encoding. Examples of apparatus and systems in which the link training techniques may be implemented include blade servers and network routers and switches.

32 Claims, 21 Drawing Sheets

(56) References Cited

U.S. PATENT DOCUMENTS

| | | |
|---|---|---|
| 2009/0245448 A1 | 10/2009 | Ran et al. |
| 2011/0080972 A1* | 4/2011 | Xi ................. H04B 7/0617 375/267 |
| 2014/0086264 A1 | 3/2014 | Lusted et al. |
| 2014/0223265 A1 | 8/2014 | Lusted et al. |

OTHER PUBLICATIONS

International Preliminary Report on Patentability and Written opinion received for PCT Patent Application No. PCT/US2013/044369, mailed on Dec. 31, 2014, 8 pages.

* cited by examiner

PAM4 Encoding

0 ⟹ -1

1 ⟹ -1/3

2 ⟹ +1/3

3 ⟹ +1

| Cell(s) | Name | Description |
|---|---|---|
| 15:14 | Reserved | Transmitted as 0, ignored on reception. |
| 13 | Preset | 1 = Preset coefficients<br>0 = Normal operation |
| 12 | Initialize | 1 = Initialize coefficients<br>0 = Normal operation |
| 11:6 | Reserved | Transmitted as 0, ignored on reception. |
| 5:4 | Coefficient (+1) update | 5 4<br>1 1 = reserved<br>0 1 = increment<br>1 0 = decrement<br>0 0 = hold |
| 3:2 | Coefficient (0) update | 3 2<br>1 1 = reserved<br>0 1 = increment<br>1 0 = decrement<br>0 0 = hold |
| 1:0 | Coefficient (−1) update | 1 0<br>1 1 = reserved<br>0 1 = increment<br>1 0 = decrement<br>0 0 = hold |

*Fig. 7* (prior art)

| Cell(s) | Name | Description |
|---|---|---|
| 15 | Receiver ready | 1 = The local receiver has determined that training is complete and is prepared to receive data.<br>0 = The local receiver is requesting that training continue. |
| 14:6 | Reserved | Transmitted as 0, ignored on reception. |
| 5:4 | Coefficient (+1) status | 5 4<br>1 1 = maximum<br>1 0 = minimum<br>0 1 = updated<br>0 0 = not_updated |
| 3:2 | Coefficient (0) status | 3 2<br>1 1 = maximum<br>1 0 = minimum<br>0 1 = updated<br>0 0 = not_updated |
| 1:0 | Coefficient (−1) status | 1 0<br>1 1 = maximum<br>1 0 = minimum<br>0 1 = updated<br>0 0 = not_updated |

*Fig. 8* (prior art)

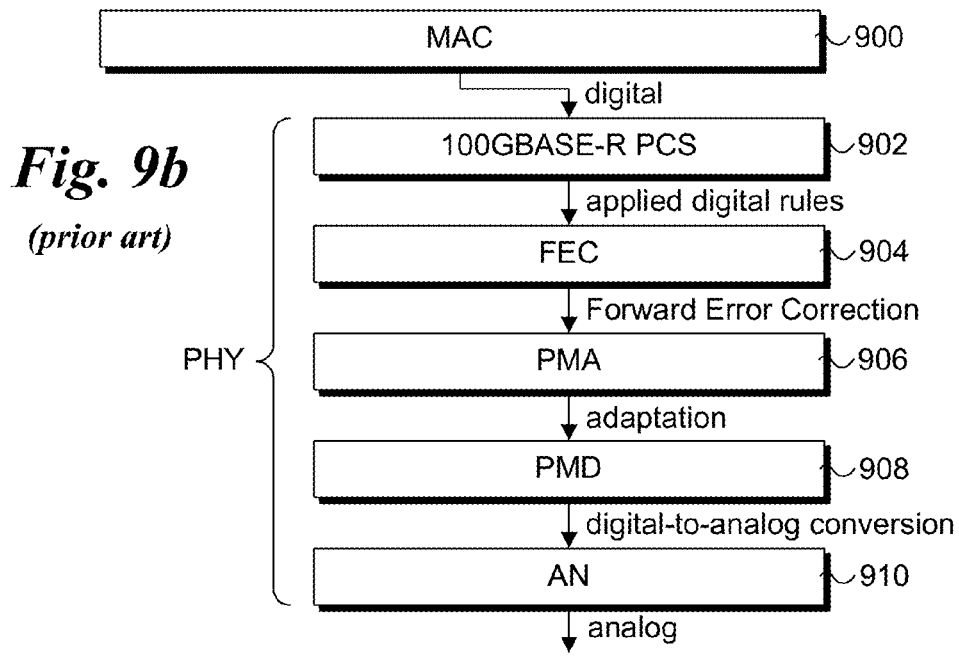
Fig. 9b *(prior art)*
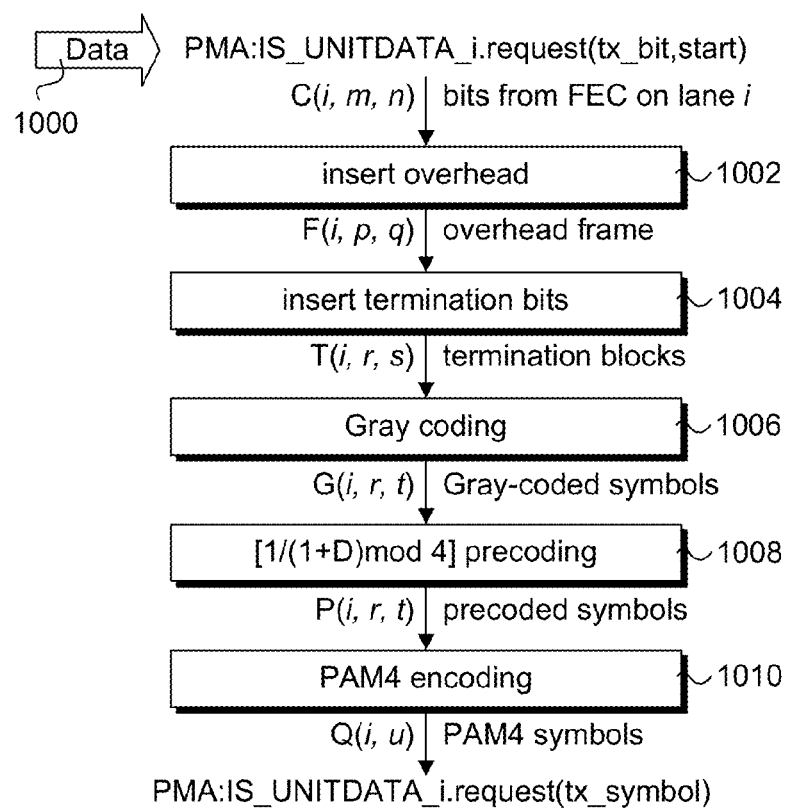
Fig. 10 *(prior art)*

| training frame word | | 45:26 | 35:26 | 25:16 | 15:6 | 5:0 | |
|---|---|---|---|---|---|---|---|
| 1 | DME | 10'b1 1111111111 | 10'b1 1111111111 | 3'b1 7'b0 1100000000 | 10'b0 0000000000 | 6'b0 000000 | frame marker |
| 2 | DME | cell 15 1111111111 | cell 14 0000000000 | cell 13 1111111111 | cell 12 0000000000 | overhead 111000 | coef update |
|   | value | 0 | 0 | 0 | 0 | 1 |  |
| 3 | DME | cell 11 1111111111 | cell 10 0000000000 | cell 9 1111111111 | cell 8 0000000000 | overhead 111000 | coef update |
|   | value | 0 | 0 | 0 | 0 | 1 |  |
| 4 | DME | cell 7 1111111111 | cell 6 0000000000 | cell 5 1111111111 | cell 4 0000000000 | overhead 111000 | coef update |
|   | value | 0 | 0 | 0 | 0 | 1 |  |
| 5 | DME | cell 3 1111111111 | cell 2 0000000000 | cell 1 1111111111 | cell 0 0000000000 | overhead 111000 | coef update |
|   | value | 0 | 0 | 0 | 0 | 1 |  |

*Fig. 12a*

| training frame word | | 45:26 | 35:26 | 25:16 | 15:6 | 5:0 | | |
|---|---|---|---|---|---|---|---|---|
| 1 | DME | 10b1 1111111111 | 10b1 1111111111 | 3b1 7b0 110000000 | 10b0 0000000000 | 6'b0 000000 | | frame marker |
| 2 | DME | cell 15 1111111111 | cell 14 0000000000 | cell 13 1111100000 | cell 12 1111111111 | overhead 000111 | 0 | coef update |
| | value | 0 | 0 | 0 | 1 | 0 | 1 | |
| 3 | DME | cell 11 0000000000 | cell 10 1111111111 | cell 9 0000000000 | cell 8 1111111111 | overhead 000111 | 0 | coef update |
| | value | 0 | 0 | 0 | 0 | 0 | 1 | |
| 4 | DME | cell 7 0000000000 | cell 6 1111100000 | cell 5 1111111111 | cell 4 0000000000 | overhead 111000 | 0 | coef update |
| | value | 0 | 0 | 1 | 0 | 0 | 1 | |
| 5 | DME | cell 3 1111111111 | cell 2 0000000000 | cell 1 1111111111 | cell 0 0000000000 | overhead 111000 | 0 | coef update |
| | value | 0 | 0 | 0 | 0 | 0 | 1 | |

*Fig. 12b*

| training frame word | 45:26 | 35:26 | 25:16 | 15:6 | 5:0 | |
|---|---|---|---|---|---|---|
| 1 | 10'b1 | 10'b1 | 3'b1 7'b0 | 10'b0 | 6'b0 | frame marker |
| 2 | cell 15 | cell 14 | cell 13 | cell 12 | overhead | coef update |
| 3 | cell 11 | cell 10 | cell 9 | cell 8 | overhead | coef update |
| 4 | cell 7 | cell 6 | cell 5 | cell 4 | overhead | coef update |
| 5 | cell 3 | cell 2 | cell 1 | cell 0 | overhead | coef update |
| 6 | cell 15 | cell 14 | cell 13 | cell 12 | overhead | status report |
| 7 | cell 11 | cell 10 | cell 9 | cell 8 | overhead | status report |
| 8 | cell 7 | cell 6 | cell 5 | cell 4 | overhead | status report |
| 9 | cell 3 | cell 2 | cell 1 | cell 0 | overhead | status report |
| 10 | 1 prbs12 | prbs12 | prbs12 | prbs12 | prbs12 + term bit | training pattern |
| 11 | 2 prbs12 | prbs12 | prbs12 | prbs12 | prbs12 + term bit | training pattern |
| 12-99 | 3-91 prbs12 | prbs12 | prbs12 | prbs12 | prbs12 + term bit | training pattern cont'd |
| 100 | 92 prbs12 | prbs12 | prbs12 | prbs12 | prbs12 + term bit | training pattern |
| 101 | 1 prbs12i | prbs12i | prbs12i | prbs12i | prbs12i + term bit | inverted training pattern |
| 102 | 2 prbs12i | prbs12i | prbs12i | prbs12i | prbs12i + term bit | inverted training pattern |
| 103-190 | prbs12i | prbs12i | prbs12i | prbs12i | prbs12i + term bit | inverted train. pat. cont'd |
| 191 | prbs12i | prbs12i | prbs12i | prbs12i | prbs12i + term bit | inverted training pattern |

*Fig. 13*

LINK TRAINING AND TRAINING FRAME FOR 100GBPS ETHERNET

FIELD OF THE INVENTION

The field of invention relates generally to Ethernet-based interconnects and, more specifically but not exclusively relates to techniques for implementing link training for a 100 GHz Ethernet link.

BACKGROUND INFORMATION

Ever since the introduction of the microprocessor, computer systems have been getting faster and faster. In approximate accordance with Moore's law (based on Intel® Corporation co-founder Gordon Moore's 1965 publication predicting the number of transistors on integrated circuits to double every two years), the speed increase has shot upward at a fairly even rate for nearly three decades. At the same time, the size of both memory and non-volatile storage has also steadily increased, such that many of today's personal computers are more powerful than supercomputers from just 10-15 years ago. In addition, the speed of network communications has likewise seen astronomical increases.

Increases in processor speeds, memory, storage, and network bandwidth technologies have resulted in the build-out and deployment of networks with ever substantial capacities. More recently, the introduction of cloud-based services, such as those provided by Amazon (e.g., Amazon Elastic Compute Cloud (EC2) and Simple Storage Service (S3)) and Microsoft (e.g., Azure and Office 365) has resulted in additional network build-out for public network infrastructure, in addition to the deployment of massive data centers to support these services which employ private network infrastructure.

A typical data center deployment includes a large number of server racks, each housing multiple rack-mounted servers or blade servers. Communications between the rack-mounted servers is typically facilitated using the Ethernet (IEEE 802.3) protocol over copper wire cables. In addition to the option of using wire cables, blade servers and network switches and routers may be configured to support communication between blades or cards in a rack over an electrical backplane or mid-plane interconnect.

In recent years, the speed of Ethernet connections over copper wiring has reached the 10 Gigabits per second (Gpbs) and 40 Gpbs level. Moreover, The IEEE (Institute of Electrical and Electronics Engineers) is currently developing a specification (IEEE 802.3bj) defining a new backplane PHY type called 100GBASE-KP4 that is targeted for a bandwidth of 100 Gbps over electrical backplanes with a loss up to 33 dB at 7 GHz. A similar specification for a new 100 Gbps over a cable connection is also being defined by the IEEE. An important aspect for facilitating successful implementation of 100 Gbps links is link training.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 7 is a table illustrating exemplary encodings for cells in Coefficient Update fields;

FIG. 8 is a table illustrating exemplary encodings for cells in Status Report fields;

FIG. 9b is a schematic diagram illustrating further details of selected LAN CSMA/CD layers in FIG. 9a;

FIG. 10 is a transmit adaption process diagram illustrating operations performed by the PMA sublayer during link up transmit operations.

FIGS. 12a and 12b are data structure diagrams illustrating the Frame Marker and Coefficient Update portions of a Training Frame, and further illustrating respective parity schemes, according to one embodiment;

FIG. 13 is a diagram of a data structure illustrating a training frame, accordingly to one embodiment;

FIG. 16b is a rear isometric view of the blade server chassis of FIG. 16a;

DETAILED DESCRIPTION

Embodiments of methods and apparatus for implementing training for a next-generation high-speed Ethernet links are described herein. In the following description, numerous specific details are set forth (such as implementation of a 100 Gbps Ethernet link) to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments for facilitating link training for the high-speed Ethernet links including the proposed 100GBASE-KP4 PHY are disclosed herein. In order to preserve compatibility with existing training mechanisms, some aspects of link training for the 100GBASE-KP4 PHY are common to similar aspects defined for the IEEE 10GBASE-KR PHY, which is targeted at 10 Gbps links and is currently employed in various types of equipment such as switches and routers. Additionally, there are other common aspects that are defined in IEEE Std 802.3ap-2007. While these common aspects may be identified and briefly discussed herein, corresponding detailed discussions of how these aspects may operate or be implemented are generally not provided herein in order to not obscure inventive aspects of the embodiments. Other aspects of some embodiments are described in further detail in IEEE P802.3bj Draft 1.0 and IEEE P802.3bh Draft 3.1.

Figures 1, 2:
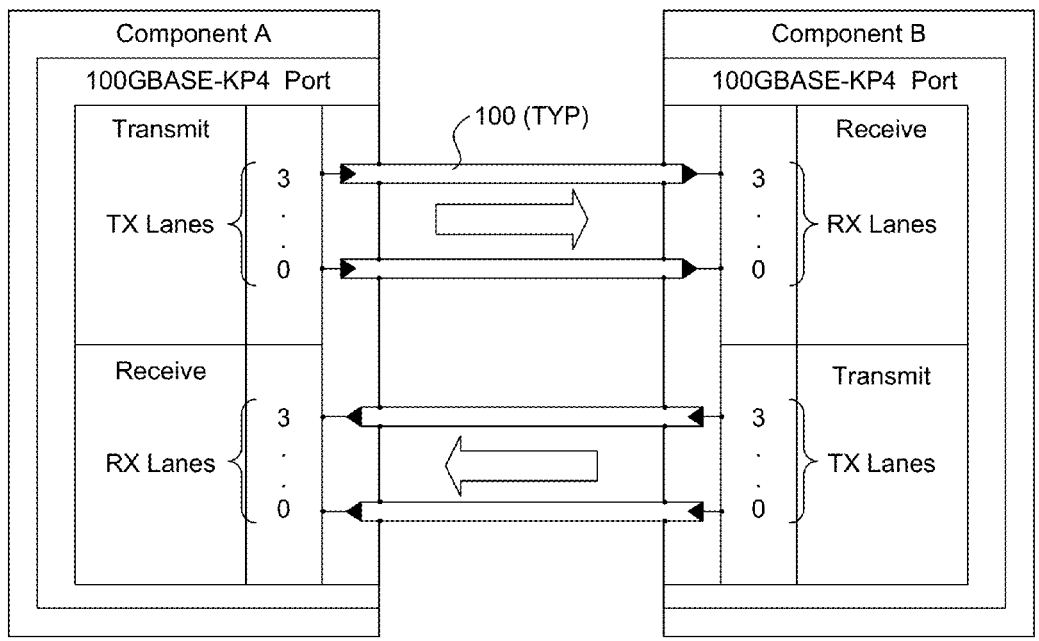
FIG. 1 is a schematic diagram illustrating the structure of a 100GBASE-KP4 link, according to one embodiment.
FIG. 2 is a diagram illustrating mapping for PAM4 encoding.

The Physical layer (also referred to a "PHY") structure of a 100GBASE-KP4 link is illustrated in FIG. 1. The PHY defines the physical structure of the interconnect and is responsible for dealing with details of operation of the signals on a particular link between two link partners, such as depicted by components A and B. This layer manages data transfer on the signal wires, including electrical levels, timing aspects, and logical issues involved in sending and receiving each bit of information across the parallel lanes. As shown in FIG. 1, the physical connectivity of each interconnect link is made up of four differential pairs of signals 100, comprising lanes 0-3 in each direction. Each port supports a link pair consisting of two uni-directional links to complete the connection between two components. This supports traffic in both directions simultaneously.

Components with 100GBASE-KP4 ports communicate using a pair of uni-directional point-to-point links, defined as a link pair, as shown in FIG. 1. Each port comprises a Transmit (Tx) link interface and a Receive (Rx) link interface. For the illustrated example, Component A has a Tx port that is connected to Component B Rx port. One uni-directional link transmits from Component A to Component B, and the other link transmits from Component B to Component A. The "transmit" link and "receive" link is defined relative to which component port is transmitting and which is receiving data. In the configuration illustrated in FIG. 1, the Component A transmit link transmits data from the Component A Tx port to the Component B Rx port. This same Component A transmit link is the Port B receive link.

The 100GBASE-KP4 PHY uses a 4-level pulse amplitude modulation (referred to as PAM4) signal to send and receive data across the channel. As shown in FIG. 2, PAM4 consists of four logical levels that are mapped as follows:

| | |
|---|---|
| 0 | maps to −1 |
| 1 | maps to −⅓ |
| 2 | maps to +⅓ |
| 3 | maps to +1 |

Logical levels 0 and 3 respectively correspond to low and high level signals having signal levels −1 and +1, while logical levels 1 and 2 correspond to intermediate level signals have signal levels −⅓ and +⅓.

The physical signaling for the 100GBASE-KP4 PHY employs a Unit Interval (UI) of 1 bit having a time corresponding to 13.59375 Gbd symbols (~73.6 psec). In one embodiment a Training Frame Word (TFW) of 46 UI is employed for link training.

Figure 3:
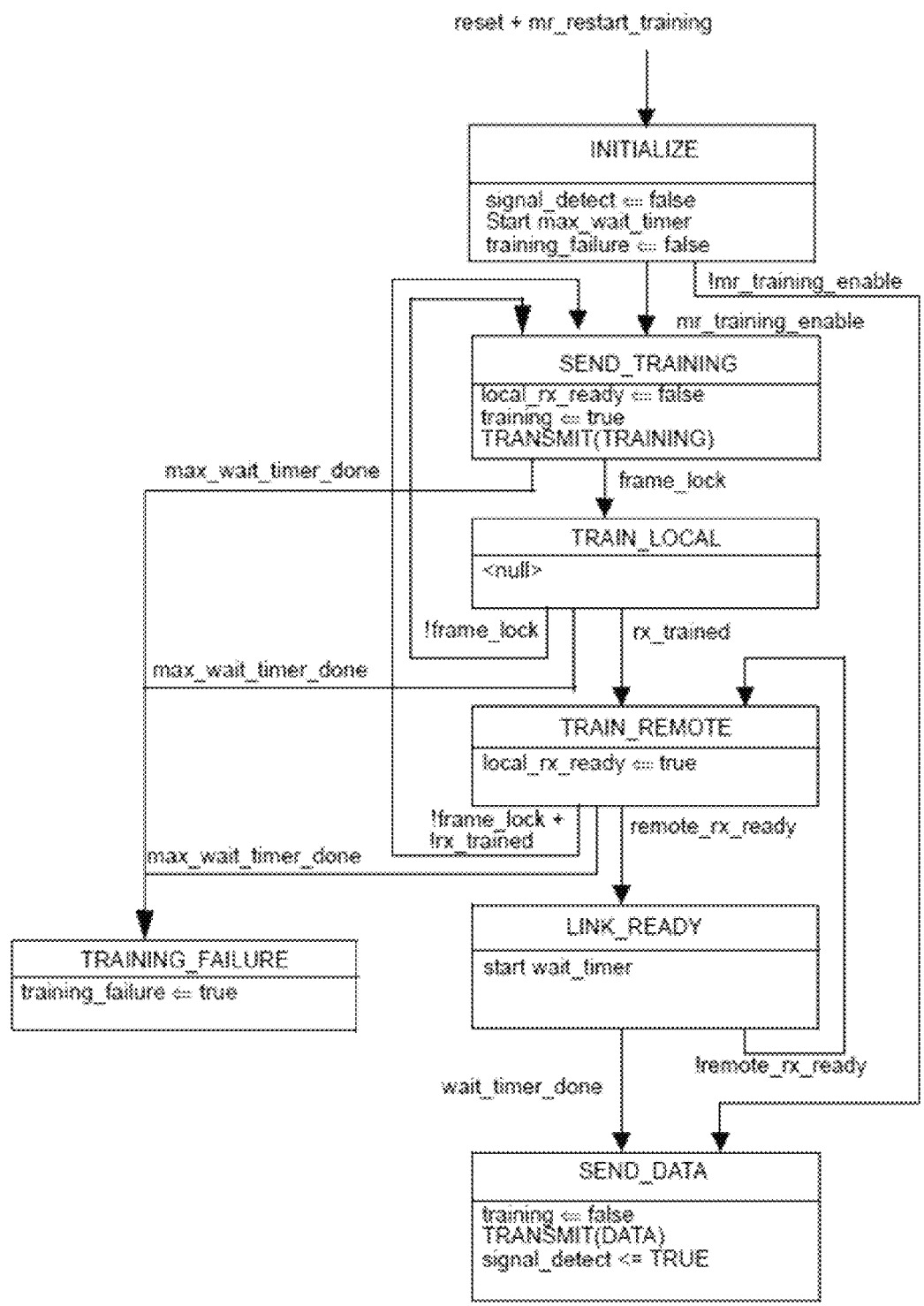
FIG. 3 is a training state diagram for a 10GBASE-KR PHY.

In one embodiment, the format for the training sequence for the 100GBASE-KP4 PHY is loosely defined to be similar to that employed for the 10GBASE-KR PHY defined in the IEEE Std. 802.3ap-2007 specification. The training state diagram for 10GBASE-KR PHY is shown in FIG. 3. A significant difference between the 10GBASE-KR PHY and the 100GBASE-KP4 PHY is that the former defines a NRZ (Non-return to Zero) 2-level (PAM2) PHY rather than a 4-level PAM4 signal.

Figure 4A:
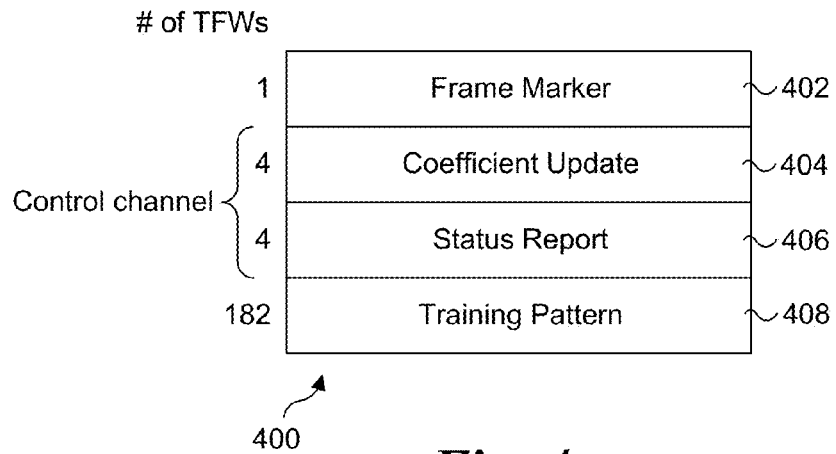
FIG. 4a is a block diagram showing the components of a training frame, according to one embodiment.
Figure 4B:
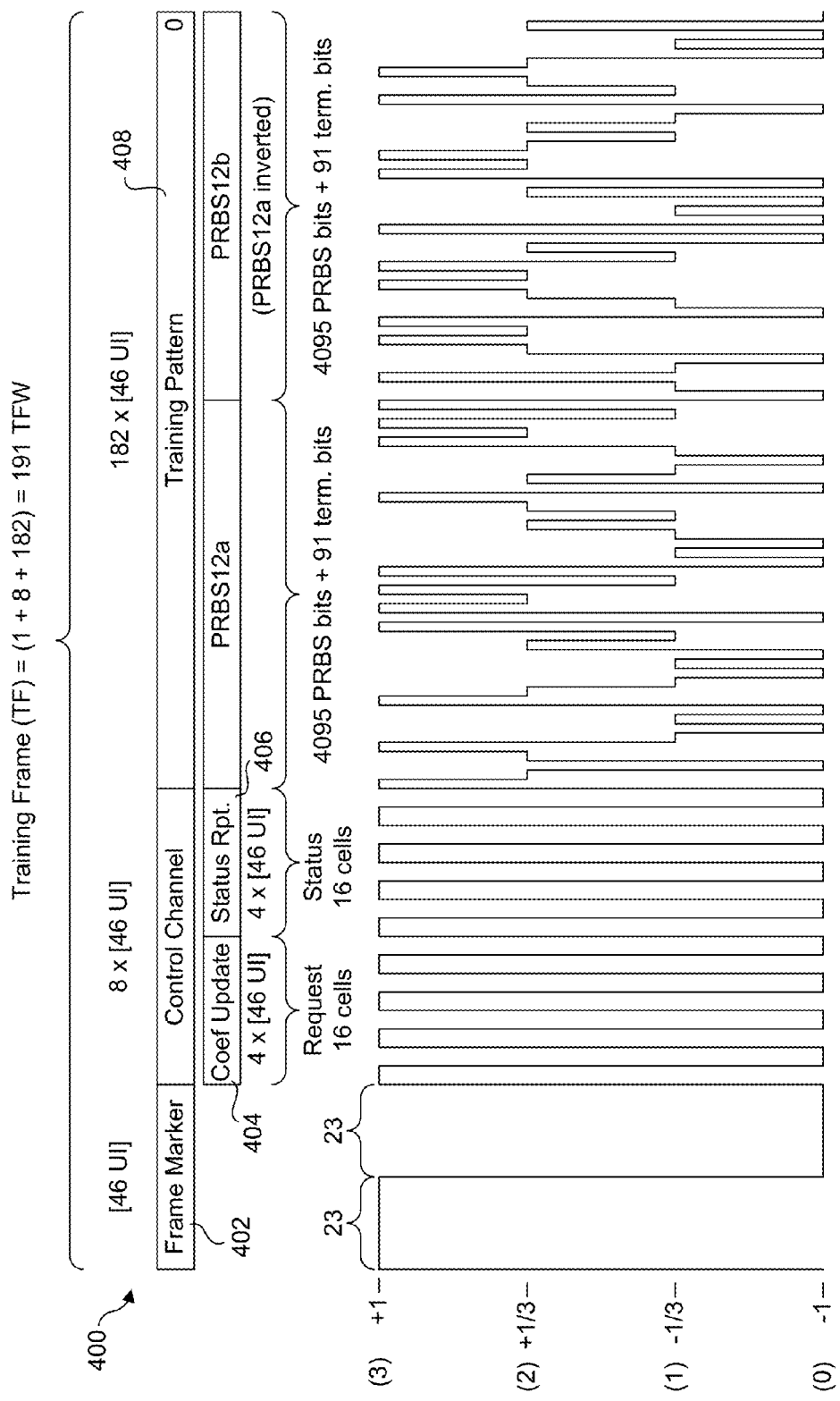
FIG. 4b is a schematic diagram illustrating a training frame and exemplary signaling, according to one embodiment.

The 100GBASE-KP4 link is established using the following sequence:

(1) Auto-negotiate capabilities to link partner
(2) Send out training sequence to tune PHY for the channel's characteristics
    Obtain Frame Lock
    TX FFE handshake: Adapt Tx coefficients to channel characteristics
    DSP converged: Train Rx to channel
    Status Exchange Ready or not?
(3) Go to data mode and Send out idle symbols The training frame is a fixed length structure that is sent continuously during training. As shown in FIG. 4a, in one embodiment, a training frame 400 includes a Frame Marker 402 comprising 1 TFW, a Control Channel including a Coefficient Update 404 and a Status Report 406, each comprising 4 TFWs, and a Training Pattern 408 comprising 182 TFWs for a total of 191 TFWs. Further details of training frame 400 are shown in FIG. 4b and discussed below.

In one embodiment, Frames are delimited by the bit pattern, hexadecimal 3FFFFFF800000 (23 ones followed by 23 zeros), as expressed in 13.59375 Gbd symbols. This is illustrated by the Frame Markers shown in FIGS. 4b, 5a, 5b, 12a, 12b, and 13 and 14. In one embodiment this may be changed to 0000007FFFFF (23 zeros followed by 23 ones) if the total parity of the previous frame was odd. These patterns do not appear in the control channel or the training pattern and therefore serves as a unique indicator of the start of a training frame.

Figure 6:
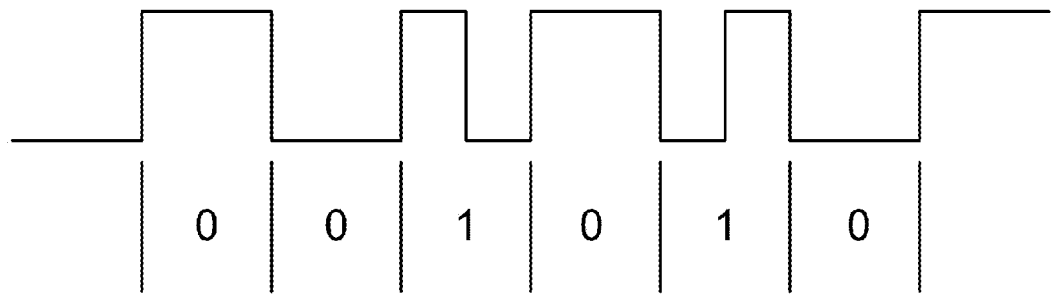
FIG. 6 is a diagram illustrating differential Manchester coding.

The control channel is transmitted using differential Manchester encoding DME. An example of DME is shown in FIG. 6. The rules of differential Manchester encoding are as follows:

a) A data transition shall occur at each cell boundary.

b) A mid-cell data transition shall be used to signal a logical one.

c) The absence of a mid-cell data transition shall be used to signal a logical zero.

If a coding violation is detected within the bounds of the control channel in a given training frame, the contents of the control channel for that frame are ignored.

Figure 5A:
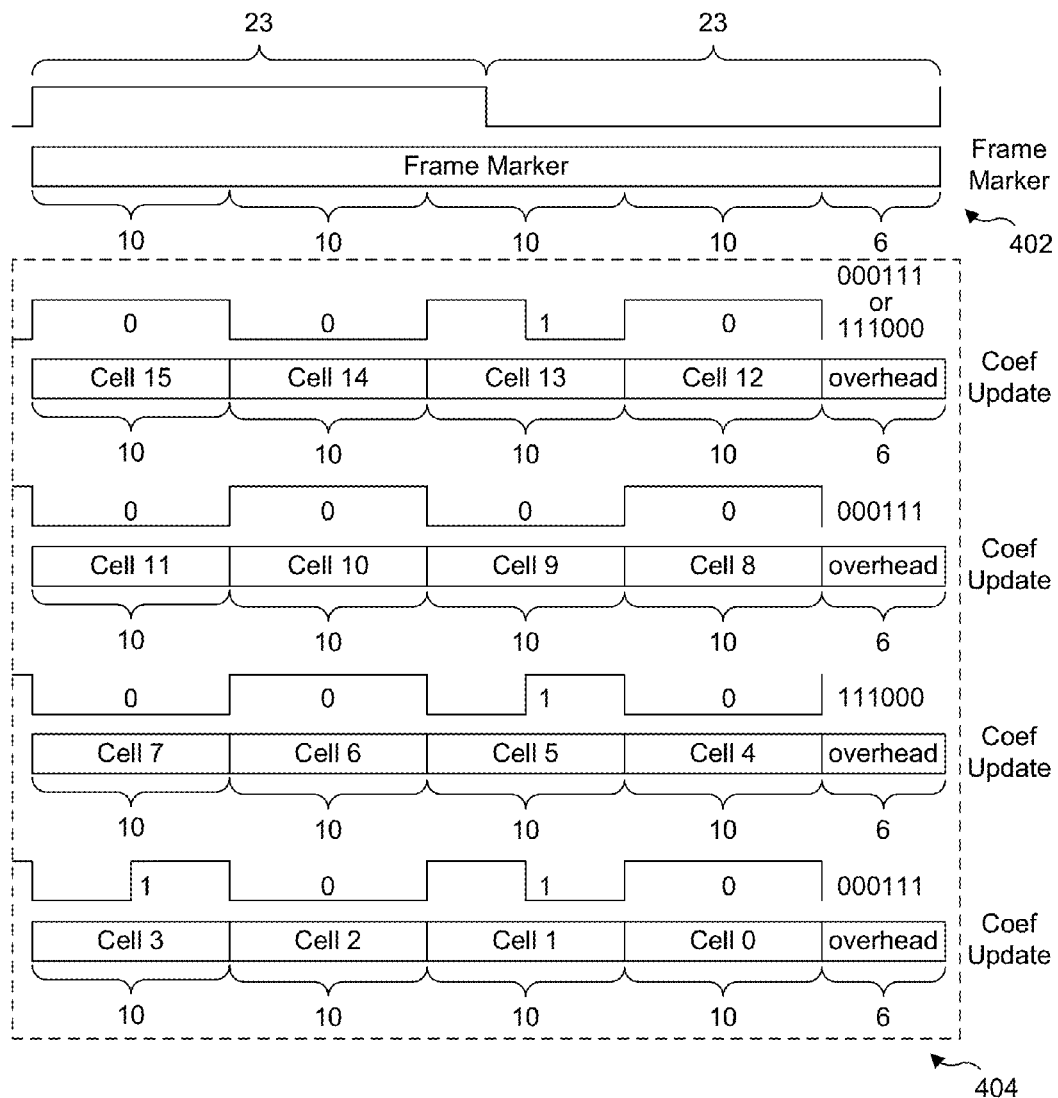
FIG. 5a shows an exemplary structure for a Frame Marker and Coefficient Update portion of a training frame, according to one embodiment.
Figure 5B:
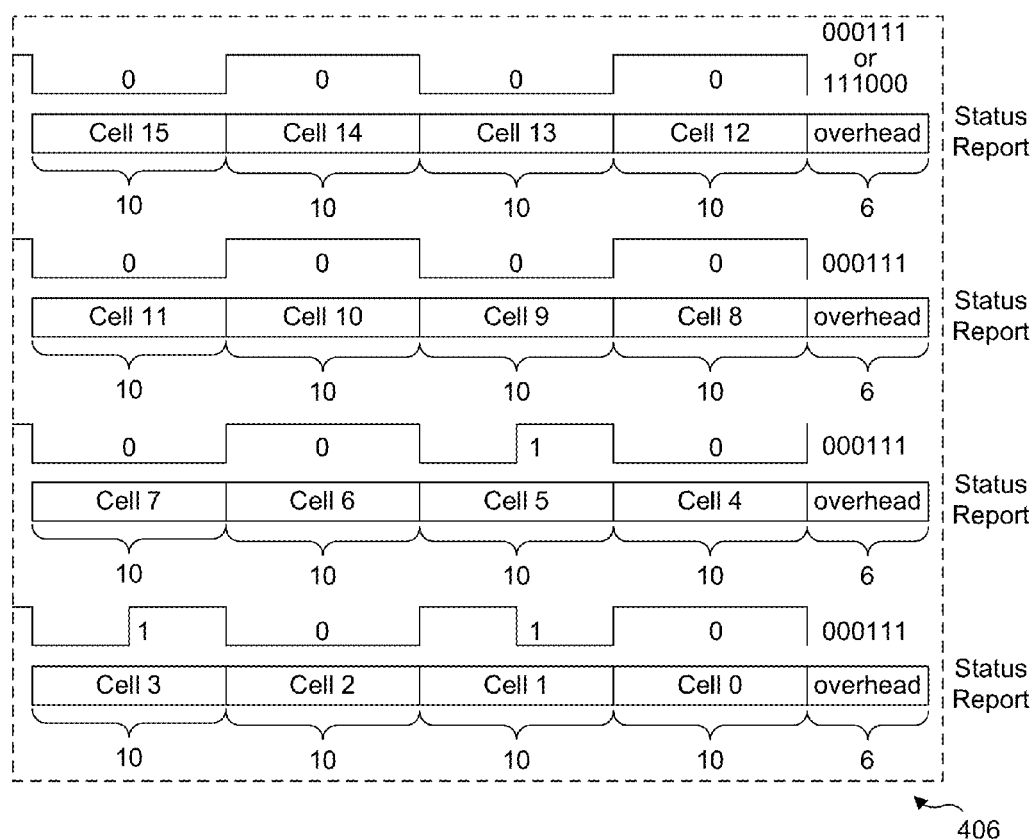
FIG. 5b shows an exemplary structure for a Status Report portion of a training frame, according to one embodiment.

As shown in FIGS. 4b, 5a and 5b, in one embodiment Coefficient Update 404 comprises a 16 cell request, while Status Report 406 comprises a 16 cell Status. The length for the cells in each of Coefficient Update 404 and Status Report 406 is 10 UI, and each of the 4 TFWs are configured as four cells followed by a 6 UI overhead field, resulting in a control channel length of 8×46=368 UI. In one embodiment at least a portion of the cells in Coefficient Update 404 are mapped to corresponding coefficient update fields defined for the 10GBASE-KR PHY shown in FIG. 7, while at least a portion of the cells in Status Report 406 are mapped to corresponding status report fields in defined for the 10GBASE-KR PHY shown in FIG. 8.

Figure 9A:
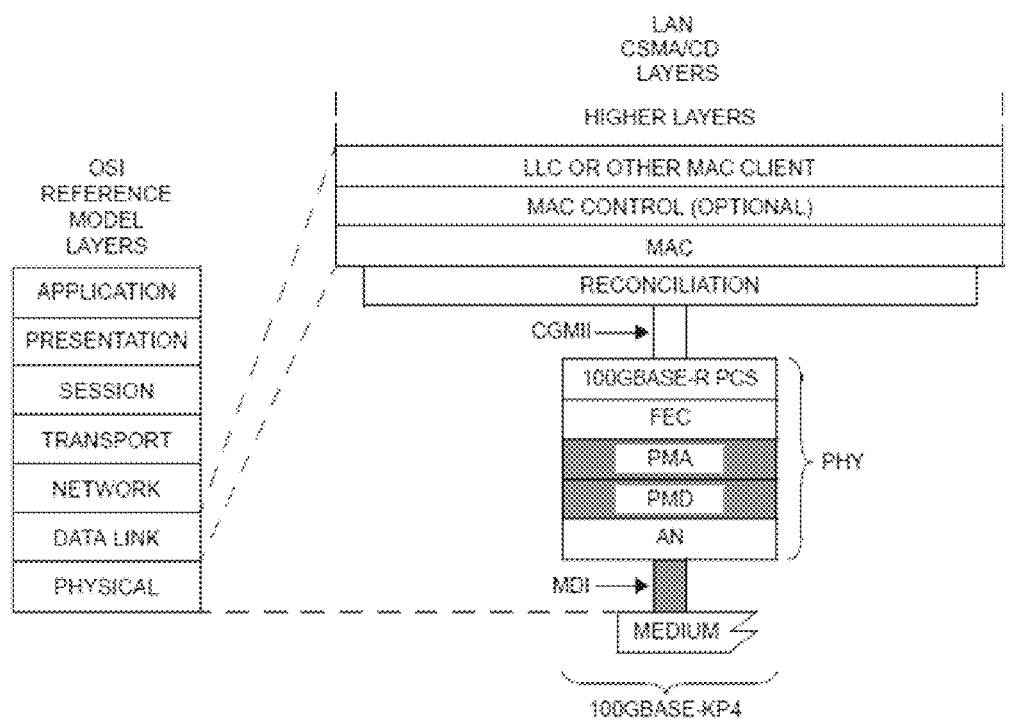
FIG. 9a is a schematic diagram illustrating the relationship between the Data Link and Physical layers of the OSI reference model and IEEE 802.3 LAN CSMA/CD LAN model layers corresponding to the current draft of 100GBASE-KP4 defined in IEEE P802.3bj Draft 1.0.

FIG. 9a shows details of the relationship between the Data Link and Physical layers of the OSI reference model and IEEE 802.3 LAN CSMA/CD LAN model layers corresponding to the current draft of 100GBASE-KP4 defined in IEEE P802.3bj Draft 1.0. FIG. 9b shows further details of selected LAN CSMA/CD layers, including a MAC (Media Access Control) layer 900, a 100GBASE-R Physical Coding Sublayer (PCS) sublayer 902, a Forward Error Correction (FEC) sublayer 904, a Physical Media Attachment (PMA) sublayer 906, a Physical Media Dependent (PMD) sublayer 908, and an Auto-Negotiation (AN) sublayer 910. Data is received in digital format as a binary bit stream by MAC layer 900, which processes and forwards the binary data to 100GBASE-R PCS sublayer 902, which applies digital rules to the binary data to transform the data as described below. The transformed digital data are then passed to FEC sublayer 904, which performs Forward Error Correction. FEC uses the coding gain to increase the link budget and BER performance on a given channel. The link budget consists of the electrical parameters which define the connection between the transmit circuitry and the receive circuitry, such as insertion loss, return loss, pulse response, etc.

In the transmit direction, the role of PMA sublayer 906 is to adapt the signal output by FEC sublayer 904 to a PAM4 encoded signal to be passed to PMD sublayer 908 and AN sublayer 910 for transfer over the attached medium. One embodiment of the adaptation processes shown in FIG. 10 includes an insert overhead block 1002, an insert termination bits block 1004, a Gray coding block 1006, a [1/(1+D) mod 4] precoding block 1008, and a PAM4 encoding block 1010.

In further detail, incoming data 1000 in FIG. 10 is received by PMA sublayer 906 from FEC sublayer 904 comprising a PMA:IS_UNITDATA_i.request (where i=0 to 3) primitive used to define the transfer of four streams of a data from the PMA client to PMA. The data conveyed by PMA:IS_UNITDATA_0.request to PMA:IS_UNITDATA_3.request consists of four parallel streams of encoded bits, one stream for each of lanes 0-3. Each tx_bit parameter is either a '1' or '0'. The start parameter is TRUE to indicate that the concurrent tx_bit is the first bit of the first, second, third, or fourth FEC symbol in the FEC codeword, or is otherwise FALSE. On each transaction, tx-bit is assigned C(i, m, n), where i is the lane number, m is an index indicating the FEC codeword number and increments at the start of each codeword, and n is an index indicating the bit number within the codeword.

Insert overhead block 1002 creates a sequence of overhead frames by inserting 40 overhead bits for every 31280 FEC bits. The FEC bits, C(i, m, n) are mapped into a continuous sequence of overhead frames. The overhead frame is 31320 bits in length. Each bit in the overhead frame is denoted F(i, p, q), where: i is the lane number; p is an index that indicates the frame number and increments at the start of each frame; and q is an index that indicates the bit number within a frame with a range 1 to 31320. The first 40 bits of the frame, F(i, p, 1) to F(i, p, 40) are the overhead bits. The next 31280 bits, F(i, p, 41) to F(i, p, 31320) are composed of the bits from 23 consecutive FEC codewords.

The overhead bits are inserted in the frame as follows:

F(i, p, 1)=H(i, p, 1)
F(i, p, 2)=H(i, p, 2)
F(i, p, . . . )=H(i, p, . . . )
F(i, p, 40)=H(i, p, 40)

The FEC codeword bits are aligned such that F(i, p, 41) is the first bit of a codeword, e.g., F(i, p, 41)=C(i, m, 1). The FEC bits are inserted into the frame in the order in which they were received from the FEC, e.g., F(i, p, 42)=C(i, m, 2), F(i, p, 43)=C(i, m, 3), and so on.

Insert termination bits block 1004 creates a sequence of termination blocks by inserting a termination bit for every 45 overhead frame bits. The termination block is 46 bits in length. Each bit in a termination block is denoted T(i, r, s), where: i is the lane number; r is an index indicating block number and increments at the start of each block; and s is an index indicating the bit number within a termination block with a range 1 to 46. The first 45 bits of each termination block, T(i, r, 1) to T(i, r, 45), are overhead frame bits. The frame bits are aligned with the termination blocks such that the first bit of an overhead bit, F(i, p, 1), corresponds to the first bit of a termination block, T(i, r, 1). The 46th bit in each termination block, T(i, r, 46), is set to zero. Overhead frame bits are mapped to the termination blocks in order of location within the overhead frame, e.g., T(i, r, 2)=F(i, p, 2), T(i, r, 3)=F(i, p, 3), and so on.

The PMA sublayer next maps consecutive pairs of bits to one of four Gray-coded via Gray coding block 1006. Each pair of bits, {A, B}, of each termination block are converted to a Gray-coded symbol with one of the four Gray-coded levels as follows:

{0, 0} maps to 0,
{0, 1} maps to 1,
{1, 1} maps to 2, and
{1, 0} maps to 3.

Gray-coded symbols corresponding to each termination block are denoted G(i, r, t), where: i is the lane number; r is an index indicating the termination block number; and t is an index indicating the symbol number within a termination block with a range 1 to 23. Pairing of bits is such that the first two bits of each termination block, T(i, r, 1) and T(i, r, 2), form a pair. Each bit pair {T(i, r, 2t−1), T(i, r, 2t)} maps to {A, B} and the Gray-coded result is assigned to G(i, r, t). The gray-coded symbol G(i, r, 23) is formed from the last two bits of a termination block including one overhead frame bit and one termination bit (of value zero); thus G(i, r, 23), the Gray-coded termination symbol, always takes the value 0 or 3.

Precoding of the Gray-coded symbols is next performed by [1/(1+D) mod 4] precoding block 1008. The precoder output symbols are denoted, P(i, r, t), where: i is the lane number; r is an index indicating the termination block number; and t is an index indicating the symbol number within a termination block with a range 1 to 23. For each Gray-coded symbol G(i, r, t), a precoded symbol, P(i, r, t) is determined by the following algorithm:

```
If t = 23 then
    P(i, r, t) = G(i, r, t)
Else If t = 1 then
    P(i, r, t) = (G(i, r, t) – P(i, r–1, 23)) mod 4
Else
    P(i, r, ,t) = (G(i, r, t) – P(i, r, t–1)) mod 4
End If
```

The Gray-coded termination symbol, G(i, r, 23), is always equal to either 0 or 3. The precoding algorithm above applies this symbol directly to the output, thus re-initializing the loop and ensuring that the precoded termination symbol, P(i, r, 23), is always either 0 or 3.

The last operation performed by PMA sublayer 906 is PAM4 encoding performed by PAM4 encoding block 1010. The PAM4 encoded symbols are denoted Q(i, u), where i is the lane number and u is an index indicating the symbol number. Each consecutive precoder output symbol, P(i, r, t), is mapped to one of four PAM4 levels and assigned to the PAM4 encoder output Q(i, 32r+t). Mapping from the precoder output symbol P(i, r, t) to a PAM4 encoded symbol Q(i, u) is shown in FIG. 2 and discussed above. The termination symbols after PAM4 encoding, Q(i, 32r+32), are either −1 or +1.

Figure 10A:
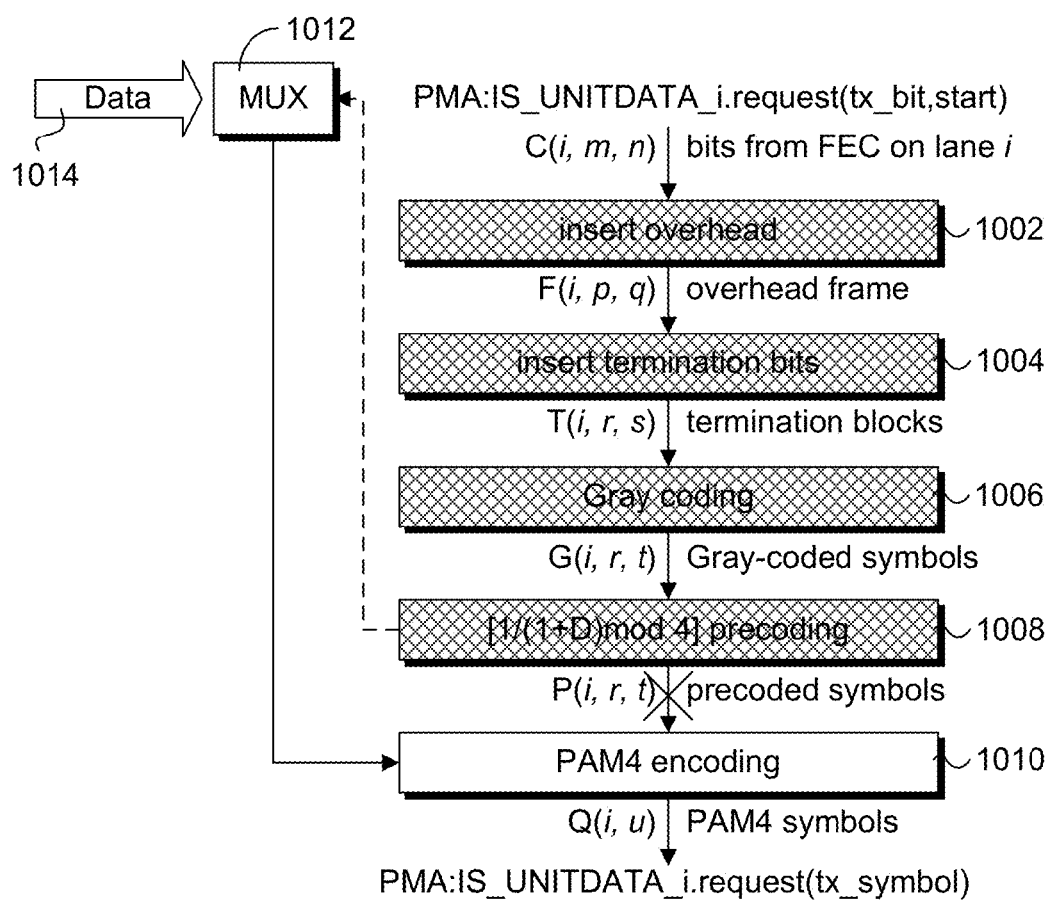
FIG. 10a is a transmit adaption process diagram illustrating operations performed by the PMA sublayer during transmission of the Frame Marker and Control Channel portions of a training frame; according to one embodiment.
Figure 10B:
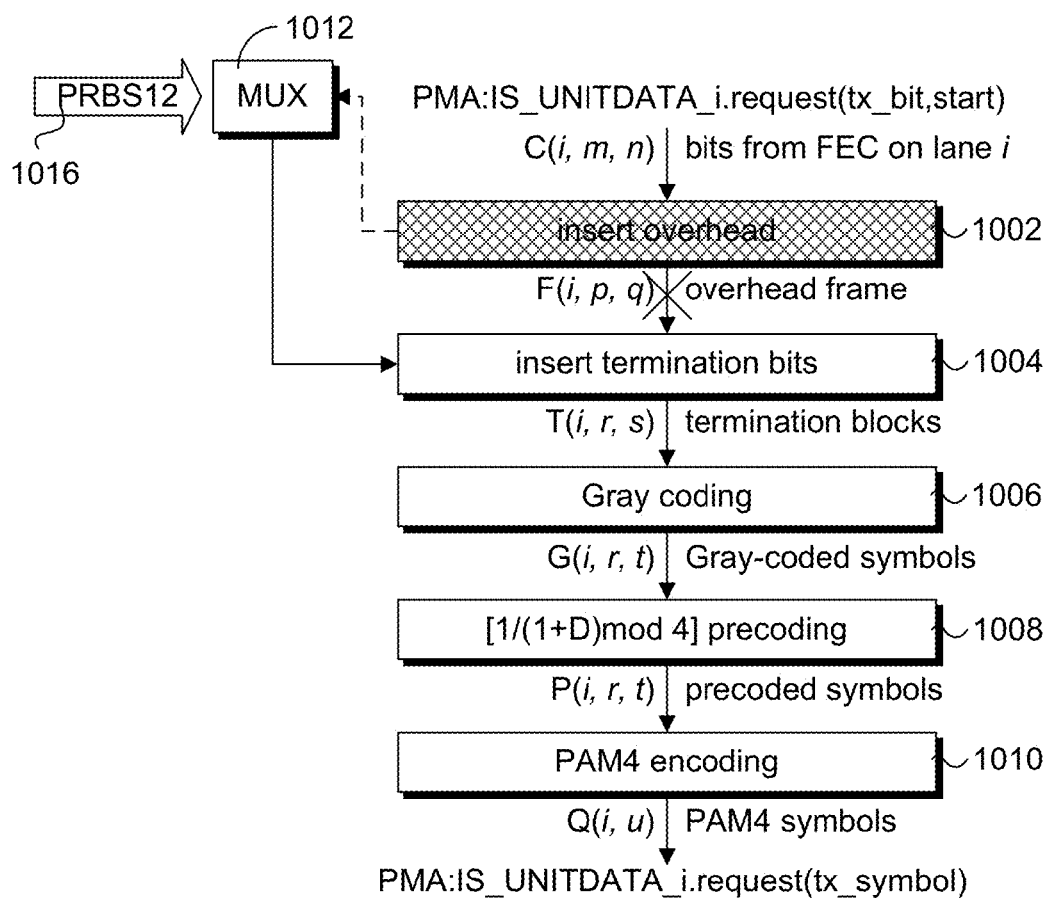
FIG. 10b is a transmit adaption process diagram illustrating operations performed by the PMA sublayer during transmission of the Training Pattern portion of a training frame; according to one embodiment.
Figure 11:
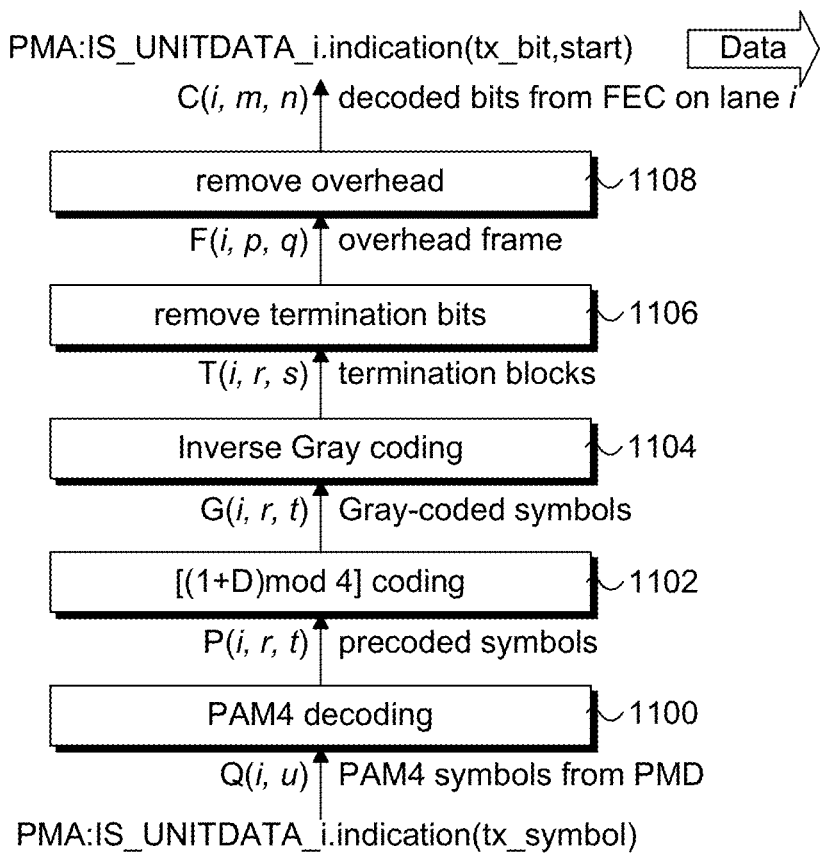
FIG. 11 is a receive adaption process diagram illustrating operations performed by the PMA sub-layer during link up receive operations.

In the received direction, the role of the 100GBASE-KP4 PMA is to adapt the PAM4 encoded signal from the PMD to a FEC encoded signal to be passed to the FEC for further processing. One embodiment of the adaptation processes are shown in FIG. 11 and include a PAM4 decoding block 1100, a [(1+D) mod 4] coding block 1102, an inverse Gray coding block 1104, a remove termination bits block 1106, and a remove overhead block 1108. In general terms, each of these blocks performs an inverse operation to a corresponding block in FIG. 10 described above. Accordingly, further details are not provided herein.

To simplify step (2) in the link establishment process discussed above when TRANSMIT(TRAINING) as shown in FIG. 3, the PAM4 multi-level signaling is not used for the Frame Marker, Coefficient Update, and Status Report data. During the transmission of Frame Marker 402, Coefficient Update 404, and Status Report 406, the PAM4 transmitter bypasses the overhead frame, termination block, gray coding, and 1/(1+D) mod 4 precoding stages of the PMA transmit and receive functional specifications. This is illustrated in FIG. 10*a*, wherein data 1014 is redirected by a multiplexer (MUX) 1012 to PAM4 encoding block 1010, by passing each of insert overhead block 1002, insert termination bits block 1004, Gray coding block 1006, and [1/(1+D) mod 4] precoding block 1008. Therefore, the output levels are restricted to level −1 for a 0 and level +1 for a 1 to enable easy receiver lock to the training pattern over poor quality and non-equalized channels.

Figure 11A:
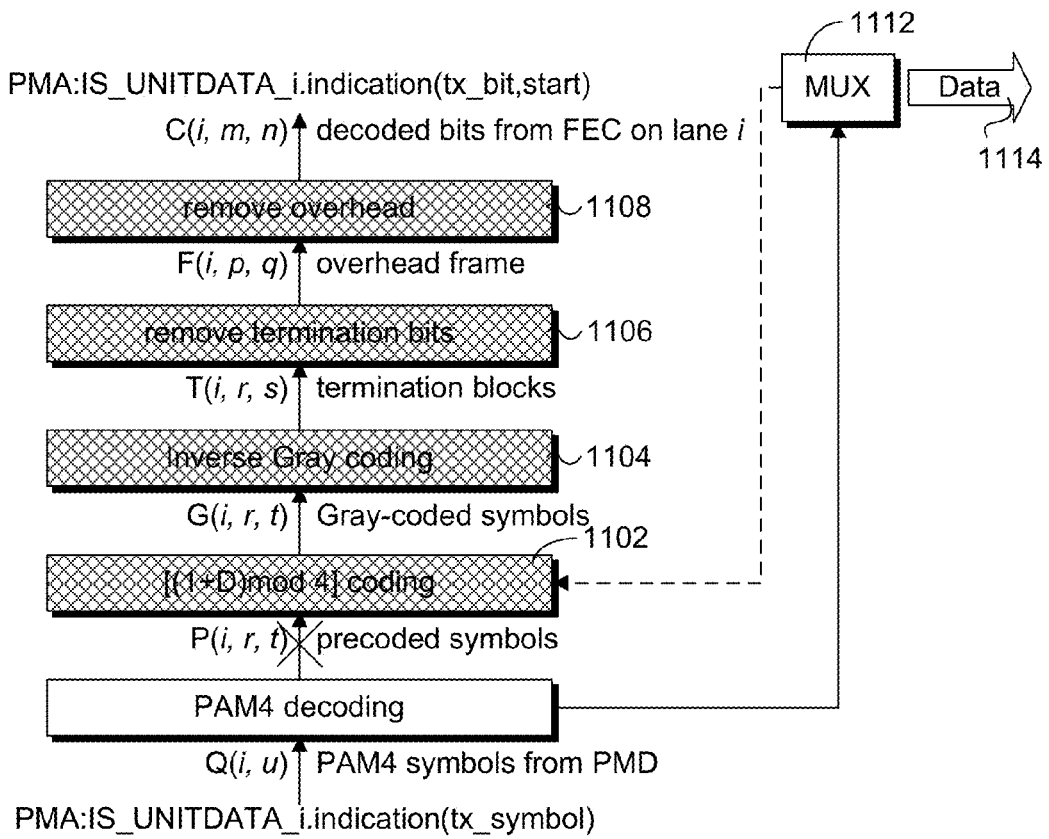
FIG. 11a is a receive adaption process diagram illustrating operations performed by the PMA sublayer during receiving of the Frame Marker and Control Channel portions of a training frame; according to one embodiment.

The corresponding receiver operations for processing received data during transmission of Frame Marker 402, Coefficient Update 404, and Status Report 406 are shown in FIG. 11*a*. As illustrated, a MUX 1112 is configured to output data 1114 from PAM4 decoding block 1000, bypassing the operations of [(1+D) mod 4] coding block 1102, inverse Gray coding block 1104, remove termination bits block 1106, and remove overhead block 1108.

As discussed above, each TFW for the Coefficient Update 404 and Status Report 406 includes a 6 UI overhead field comprising 6 overhead bits. In one embodiment, the overhead bits are set to provide a DME logic value of '1', e.g., coded as 000111 or 111000. This may be used to preserve DC balance for the TFW.

In one embodiment, a parity scheme is implemented through use of Coefficient Update and Status Report fields. Under one implementation, cell 6 of the coefficient update field table of FIG. 7 and status report field table of FIG. 8 is used to transmit parity bits, as opposed to transmitting all 0's defined for this cell by the 10GBASE-KR PHY specification. Two parity bits are calculated for each field (Coefficient Update and Status Report) separately, such that each field as a whole, including the parity bits, has even parity. The parity is the number of logical-one cells in the field, modulo 2 (not including the overhead bits). Under this parity scheme a parity check may be implemented to increase protection against false acceptance of sensitive messages, e.g., preset, init, and receiver read. In one embodiment, if a parity violation is detected within the bounds of the respective field in a given training frame, the contents of the control channel for that frame shall be ignored.

FIGS. 12*a* and 12*b* show respective examples of parity schemes, according to one embodiment. In each case the resulting DME value for the 5:0 parity field is a '1'. In FIG. 12*a*, a bit pattern of 111000 is used for the parity bits. In FIG. 12*b*, a bit pattern of 000111 is used for the parity bits.

Figure 11B:
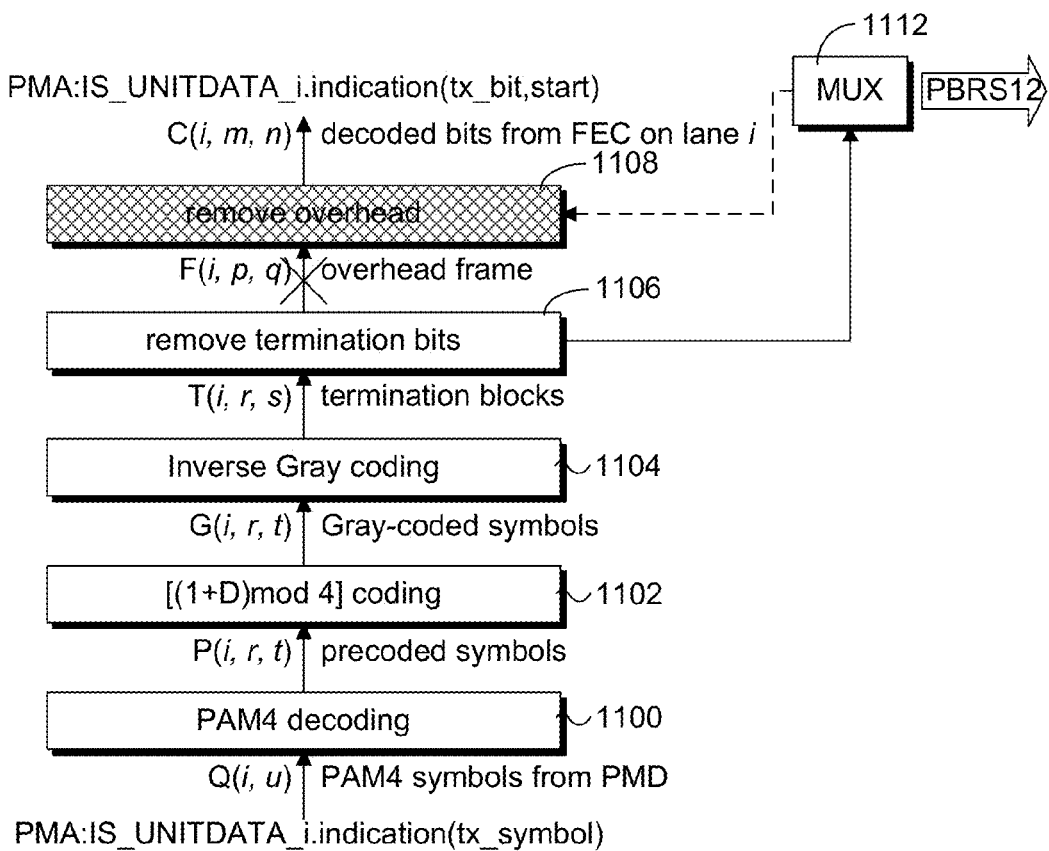
FIG. 11b is a transmit adaption process diagram illustrating operations performed by the PMA sublayer during receiving of the Training Pattern portion of a training frame; according to one embodiment.

In one embodiment, Training Pattern 408 uses the PMA transmit and receive functional specifications as currently defined in IEEE P802.3bj Draft 1.0 to enable the transmitter and receiver to exercise termination block, gray coding, and 1/(1+D) mod 4 precoding stages, while the overhead framer is bypassed. Corresponding block diagrams to facilitate the transmitter and receiver operations are shown in FIGS. 10*b* and 11*b*, respectively. Training Pattern 408 employs all four levels of PAM4 signaling to facilitate receiver calibration.

In one embodiment, input data 1016 to the termination block logic (i.e., insert termination bits block 1004 in FIG. 10*b*) comprises a 12-bit Psuedo Random Bit Sequence known as PRBS12. PRBS12 is a 4095 bit sequence derived from the function, $$G(x)=1+x^4+x^{10}+x^{11}+x^{12}$$

In one embodiment, each TFW comprises 45 bits of PRBS12 data plus one termination bit. Two full sequences of PRBS12 data (8190 bits for PRBS12, 8372 bits including the termination bits) are transmitted during the 182 TFWs corresponding to Training Pattern 408, as shown in FIGS. 4*b* and 13. In one embodiment, the second PRBS12 sequence comprises a bit inversion of the first, as depicted by PRBS12a and PRBS12b in FIG. 4*b*.

Figure 14:
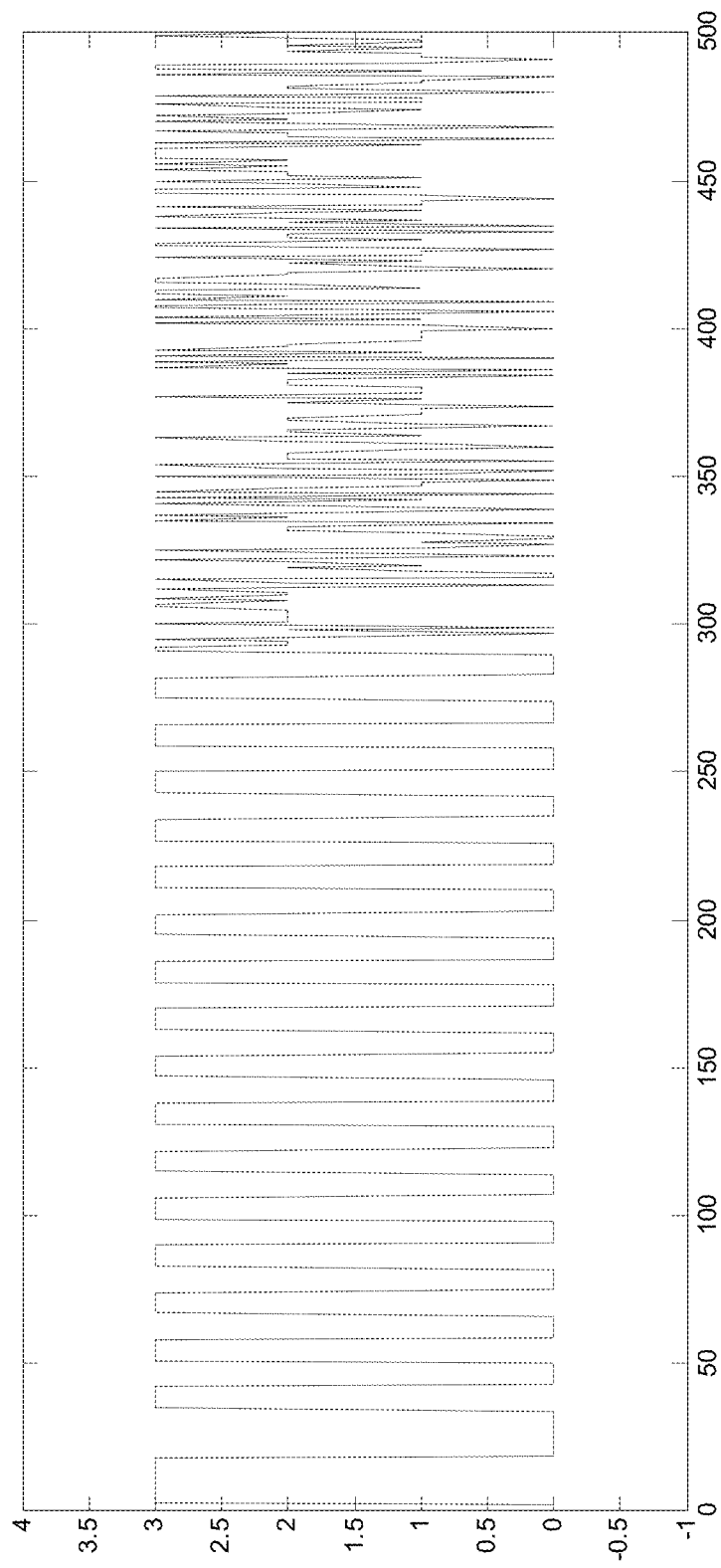
FIG. 14 is a graph illustrating signaling corresponding to an simulation of an exemplary training frame.

In addition to the example training pattern shown in FIG. 4*b*, FIG. 14 shows an example training pattern generated during a simulated link training operation. Note the full swing signaling on the left portion of the diagram during the Frame Marker and control channel portion of the frame. Also note the 4-level signaling on right during the training pattern portion of the frame.

Figure 15:
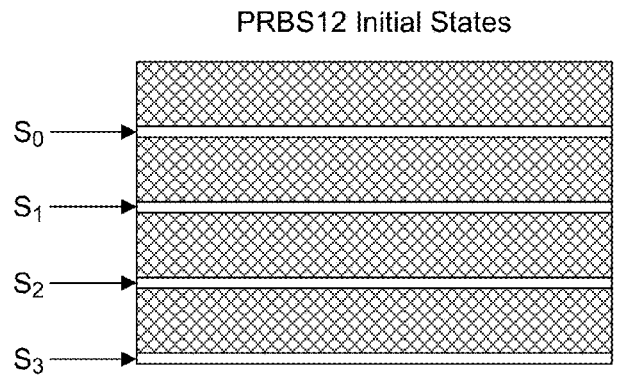
FIG. 15 is a diagram illustrating selection of four PRBS12 initiation states selected from a possible 4095 initiation states.

In one embodiment, the training pattern initial states for lanes 0-3 are derived in the following manner. Out of 4095 possible initial states in PRBS12, there are 159 for which the following process creates DC balanced results: Generate the full PRBS12 starting from the initial state, and then another full PRBS12 from the same state, inverted and apply most of the PMA data encoding (block termination, gray coding, 1/(1+D) mod 4 precoding and PAM4 mapping) to the data. From these 159 states, four states are selected for which the output is DC balanced and final state of the precoder is '0'. In one embodiment, the initial four states are selected to be approximately ¼-cycle apart from each other, as illustrated in FIG. 15. An exemplary set of initial states meeting the foregoing conditions include (initial bits sent on the data path, LSB first): S0=0x149, S1=0x8C4, S2=0x00A, S3=0xA1C. For each physical lane i=0.3, the training sequence shall start from state Si. This will also uniquely identify the lanes if they are swapped, and save lane order identification later on. For this choice of initial PRBS states, since the initial precoder state is 0, the final state is also 0. This has the benefit that the precoder state is known to be 0 upon switching to data mode (i.e., run-time link operation mode after link initialization). PRBS state and precoder state shall not advance during frame marker and control channel transmission.

Exemplary Implementation Environment and Blade Server architecture

It is envisioned that aspects of the embodiments herein may be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into LANs with appropriate switching and routing facilities between the LANs to form a private Intranet. For example, cloud hosting facilities may typically employ large data centers with a multitude of servers.

As an overview, typical blade server components and systems are shown in FIGS. 16a-c, and 17. Under a typical configuration, a rack-mounted chassis 1600 is employed to provide power and communication functions for a plurality of server blades (i.e., blades) 1602, each of which occupies a corresponding slot. (It is noted that all slots in a chassis do not need to be occupied.) In turn, one or more chassis 1600 may be installed in a blade server rack 1603 shown in FIG. 16c. Each blade is coupled to an interface plane 1604 (i.e., a backplane or mid-plane) upon installation via one or more mating connectors. Typically, the interface plane will include a plurality of respective mating connectors that provide power and communication signals to the blades. Under current practices, many interface planes provide "hot-swapping" functionality—that is, blades can be added or removed ("hot-swapped") on the fly, without taking the entire chassis down through appropriate power and data signal buffering.

Figure 16A:
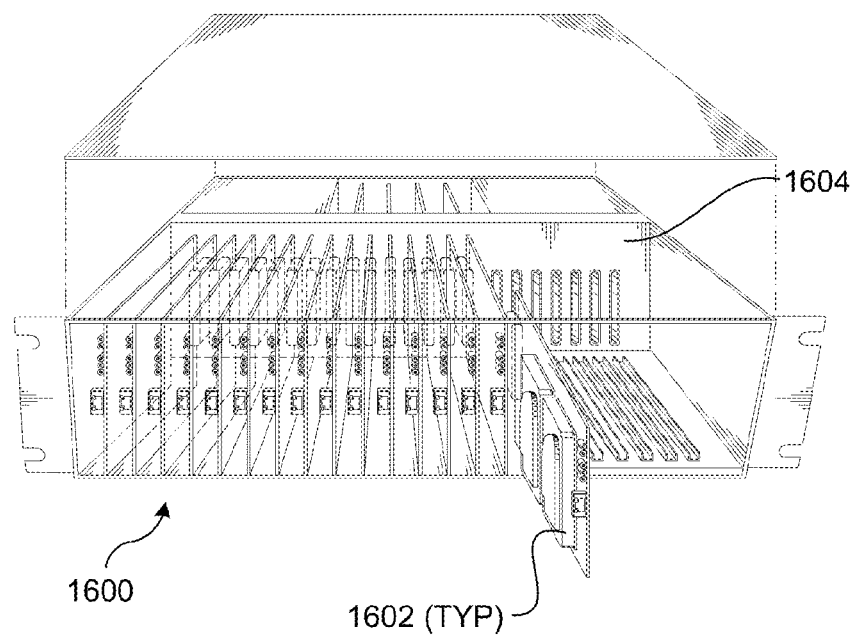
FIG. 16a is a frontal isometric view of an exemplary blade server chassis in which a plurality of server blades are installed.
Figure 16B:
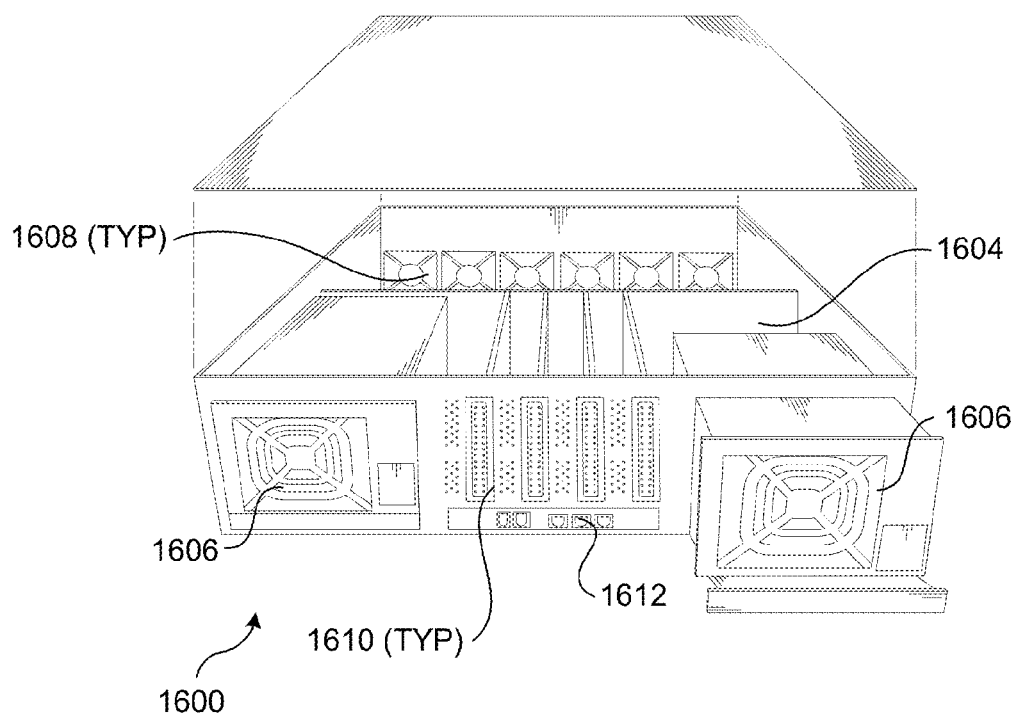
Figure 16C:
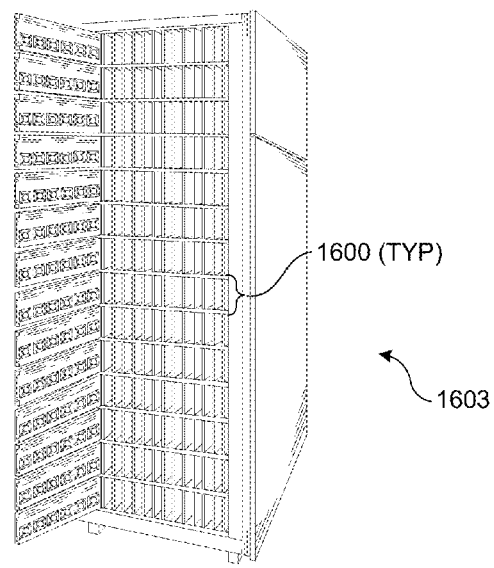
FIG. 16c is an isometric frontal view of an exemplary blade server rack in which a plurality of rack-mounted blade server chassis corresponding to FIGS. 16a and 16b are installed.

A typical mid-plane interface plane configuration is shown in FIGS. 16a and 16b. The backside of interface plane 1604 is coupled to one or more power supplies 1606. Oftentimes, the power supplies are redundant and hot-swappable, being coupled to appropriate power planes and conditioning circuitry to enable continued operation in the event of a power supply failure. In an optional configuration, an array of power supplies may be used to supply power to an entire rack of blades, wherein there is not a one-to-one power supply-to-chassis correspondence. A plurality of cooling fans 1608 are employed to draw air through the chassis to cool the server blades.

An important feature required of all blade servers is the ability to communicate externally with other IT infrastructure. This is typically facilitated via one or more network connect cards 1610, each of which is coupled to interface plane 1604. Generally, a network connect card may include a physical interface comprising a plurality of network port connections (e.g., RJ-45 ports), or may comprise a high-density connector designed to directly connect to a network device, such as a network switch, hub, or router.

Blade servers usually provide some type of management interface for managing operations of the individual blades. This may generally be facilitated by a built-in network or communication channel or channels. For example, one or more buses for facilitating a "private" or "management" network and appropriate switching may be built into the interface plane, or a private network may be implemented through closely-coupled network cabling and a network. Optionally, the switching and other management functionality may be provided by a management switch card 1612 that is coupled to the backside or frontside of the interface plane. As yet another option, a management or configuration server may be employed to manage blade activities, wherein communications are handled via standard computer networking infrastructure, for example, Ethernet.

Figure 17:
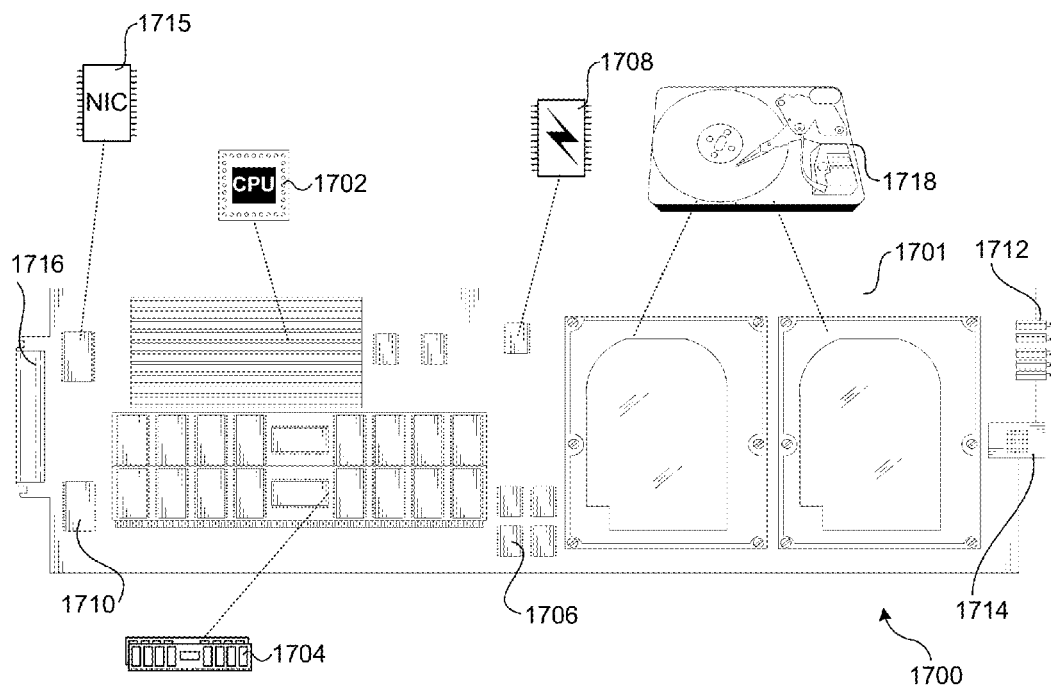
FIG. 17 shows details of the components of a typical server blade, according to one embodiment.

With reference to FIG. 17, further details of an exemplary blade 1700 are shown. As discussed above, each blade comprises a separate computing platform that is configured to perform server-type functions, i.e., is a "server on a card." Accordingly, each blade includes components common to conventional servers, including a main printed circuit board (main board) 1701 providing internal wiring (i.e., buses) for coupling appropriate integrated circuits (ICs) and other components mounted to the board. These components include one or more processors 1702 coupled to system memory 1704 (e.g., some form of Random Access Memory (RAM)), cache memory 1706 (e.g., SDRAM), and a firmware storage device 1708 (e.g., flash memory). A NIC (network interface controller) chip 1710 is provided for supporting conventional network communication functions, such as to support communication between a blade and external network infrastructure. Other illustrated components include status LED (light-emitting diodes) 1712, a set of RJ-45 console ports 1714 (only one of which is shown for simplicity), and a NIC 1715 coupled to an interface plane connector 1716. Additional components include various passive components (i.e., resistors, capacitors), power conditioning components, and peripheral device connectors.

Generally, each blade 1700 may also provide on-board storage. This is typically facilitated via one or more built-in disk controllers and corresponding connectors to which one or more disk drives 1718 are coupled. For example, typical disk controllers include SATA controllers, SCSI controllers, and the like. As an option, the disk drives may be housed separate from the blades in the same or a separate rack, such as might be the case when a network-attached storage (NAS) appliance or backend storage sub-system that is employed for storing large volumes of data.

NIC 1710 comprises circuitry and logic for facilitating corresponding networking operations, such as support for physical layer (L1) and data link layer operations (L2). Typically, upper layer operations are facilitated by an operating system network stack that would be hosted by an operating system running on processor 1702. However, in some embodiments, a NIC may employ its own network stack via embedded logic or the like.

In a typical data center deployment, network switching elements comprise rack-mounted equipment, such as would occupy a 1 U, 2 U, or 4 U slot, or may be implemented via one or more server blades. Optionally, a network switching element may be implemented use one or more server blades.

NIC 1715 comprises circuitry and logic for implementing high-speed communication between multiple blades 1700 via interface plane 1604. In one embodiment, NIC 1715 is configured to implement signaling and logic corresponding to the 100 Gbps embodiments disclosed herein, including circuitry and logic for implementing a 100GBASE-KP4 port and associated link training operations. To further facilitate inter-blade communication over the 100GBASE-KP4 PHY, interface plane 1604 includes appropriate connectors, circuitry and wiring for facilitating the physical media aspect of the PHY (wiring not shown). For example, the circuitry may comprise connectors and wiring for facilitating signaling over 8 differential pairs in accordance with the configuration shown in FIG. 1.

In general, aspects of the link training embodiments disclosed herein may be implemented hardware (via, e.g., embedded logic), or via a combination of hardware and software. For example, a network element may include a processor running a software-based network stack and associated logic implemented via software for performing aspects of the operations described herein. Optionally, similar logic could be implemented via embedded logic in a NIC, large-scale network interface, or the like.

In addition to implementation in a blade server, the principles and teachings herein may be implemented via other types of equipment, such as telecommunications routers and switches. For example, a typical telecom switch comprises a rack with multiple cards coupled to a backplane, wherein the cards are generally analogous to the blades and the backplane is analogous to the interface plane in a blade server. Accordingly, the cards would be configured with circuitry and logic for implemented 100GBASE-KP4 ports, and the backplane would include connectors, circuitry, and wiring for facilitating the physical media aspect of the 100GBASE-KP4 PHY.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for link training for a high-speed Ethernet link, comprising:
   transmitting training frames from a transmit port to be received at a receive port; each training frame comprising a frame marker portion, a control channel portion, and a training pattern portion and employing four-level pulse amplitude modulation (PAM4) signaling including a low level signal, a first intermediate level signal, a second intermediate level signal, and a high level signal;
   employing four-level signaling for the training pattern portion of the training frame, the four-level signaling including the low level signal, the first intermediate level signal, the second intermediate level signal, and the high level signal; and
   employing only the low and high level signals for the frame marker and control channel portions of the training frame,
   wherein the high-speed Ethernet link employs a Physical layer including a Physical Media Attachment (PMA) sublayer that is configured to perform a plurality of adaptation processes including an overhead insertion process, a termination process, a Gray coding process, a precoding process and a PAM4 encoding process, and wherein the training pattern data corresponding to the training pattern portion of the training frame is generated in a manner that bypasses the overhead insertion process in the PMA sublayer.

2. The method of claim 1, further comprising generating frame marker data corresponding to the frame marker portion of the training frame in a manner that bypasses the overhead process, the termination process, the Gray coding process, and the precoding process in the PMA sublayer.

3. The method of claim 1, further comprising generating control channel data corresponding to the control channel portion of the training frame in a manner that bypasses the overhead process, the termination process, the Gray coding process, and the precoding process in the PMA sublayer.

4. The method of claim 1, further comprising employing a Pseudo-Random Bit Sequence (PRBS) bit pattern for a first portion of the training pattern and employing an inversion of the PRBS bit pattern for a second portion of the training pattern.

5. The method of claim 4, wherein the PRBS bit pattern comprises a PRBS12 12-bit pattern.

6. The method of claim 5, wherein a PRBS12 initial state is selected from among PRBS12 initial states that are Direct Current (DC) balanced when used with a termination process, a Gray coding process, a precoding process and a four-level pulse amplitude modulation (PAM4) encoding process and for which the final state of a precoder operation is '0'.

7. The method of claim 6, wherein the Ethernet link comprises a multi-lane link employing four lanes, and PRBS12 initial states are selected for respective lanes such the PRBS12 initial states are approximately ¼ cycle apart from one another.

8. The method of claim 1, further comprising:
employing at least a portion of cell fields in the control channel portion of the training frame that are compatible with the Institute of Electrical and Electronics Engineers (IEEE) 10GBASE-KR PHY specification.

9. The method of claim 1, wherein the training frame comprises a plurality of training frame words have a length of 46 Unit Intervals (UIs).

10. The method of claim 9, wherein at least a portion of the training frame words include a plurality of bits that are implemented as parity bits.

11. The method of claim 10, wherein the control channel portion of the training frame includes a coefficient update portion and a status report portion, and wherein separate parity bits are employed for each of the coefficient update portion and the status report portion.

12. The method of claim 1, wherein the Ethernet link comprises a multi-lane link including multiple lanes, further comprising transmitting training frames over each of multiple lanes.

13. The method of claim 1, wherein the Ethernet link comprises a physical media implemented via wiring in one of a mid-plane or back-plane.

14. The method of claim 1, wherein the high-speed Ethernet port supports a bandwidth of 100 Gigabits per second.

15. An apparatus including a high-speed Ethernet transmit port configured to perform operations when the apparatus is operating comprising:
transmitting training frames from the transmit port to be received at a receive port; each training frame comprising a frame marker portion, a control channel portion, and a training pattern portion and employing four-level pulse amplitude modulation (PAM4) signaling including a low level signal, a first intermediate level signal, a second intermediate level signal, and a high level signal;
employing four-level signaling for the training pattern portion of the training frame, the four-level signaling including the low level signal, the first intermediate level signal, the second intermediate level signal, and the high level signal; and
employing only the low and high level signals for the frame marker and control channel portions of the training frame,
wherein the high-speed Ethernet link employs a Physical layer including a Physical Media Attachment (PMA) sublayer that is configured to perform a plurality of adaptation processes including an overhead insertion process, a termination process, a Gray coding process, a precoding process and a PAM4 encoding process, and wherein the training pattern data corresponding to the training pattern portion of the training frame is generated in a manner that bypasses the overhead insertion process in the PMA sublayer.

16. The apparatus of claim 15, wherein the high-speed Ethernet transmit port is configured to generate frame marker data and control channel data corresponding to the frame marker portion and the control channel portion of the training frame in a manner that bypasses the overhead process, the termination process, the Gray coding process, and the precoding process in the PMA sublayer.

17. The apparatus of claim 15, wherein the high-speed Ethernet transmit port is configured to employ a Pseudo-Random Bit Sequence (PRBS) bit pattern for a first portion of the training pattern and an inversion of the PRBS bit pattern for a second portion of the training pattern.

18. The apparatus of claim 15, wherein the high-speed Ethernet transmit port is configured to employ at least a portion of cell fields in the control channel portion of the training frame that are compatible with the Institute of Electrical and Electronics Engineers (IEEE) IEEE 10GBASE-KR PHY specification.

19. The apparatus of claim 15, wherein the high-speed Ethernet transmit port is configured to implement a multi-lane link including multiple lanes, and the Ethernet transmit port is further configured to transmit training frames over each of multiple lanes.

20. The apparatus of claim 15, wherein the high-speed Ethernet transmit port supports a bandwidth of 100 Gigabits per second.

21. The apparatus of claim 15, further comprising a high-speed Ethernet receive port configured to receive training frames from a second apparatus.

22. A system comprising:
a chassis;
an inter-plane, mounted within the chassis, having first and second inter-plane connectors and wiring coupled there between configured to facilitate a 100 Gigabits per second (Gbps) Ethernet link;
a first board having a first network interface controller (NIC) including 100 Gbps Ethernet transmit and receive ports operatively coupled to a first board connector that is coupled to the first inter-plane connector;
a second board having a second NIC including 100 Gbps Ethernet transmit and receive ports operatively coupled to a second board connector that is coupled to the second inter-plane connector,
wherein the 100 Gbps Ethernet transmit port of the first NIC is configured to perform operations when the apparatus is operating including,
transmitting training frames to be received at a receive port; each training frame comprising a frame marker portion, a control channel portion, and a training pattern portion and employing four-level pulse amplitude modulation (PAM4) signaling including a low level signal, a first intermediate level signal, a second intermediate level signal, and a high level signal;

employing four-level signaling for the training pattern portion of the training frame, the four-level signaling including the low level signal, the first intermediate level signal, the second intermediate level signal, and the high level signal; and employing only the low and high level signals for the frame marker and control channel portions of the training frame, wherein the high-speed Ethernet link employs a Physical layer including a Physical Media Attachment (PMA) sublayer that is configured to perform a plurality of adaptation processes including an overhead insertion process, a termination process, a Gray coding process, a precoding process and a PAM4 encoding process, and wherein the training pattern data corresponding to the training pattern portion of the training frame is generated in a manner that bypasses the overhead insertion process in the PMA sublayer.

23. The system of claim 22, wherein the 100 Gbps Ethernet transmit port of the first NIC is configured to generate frame marker data and control channel data corresponding to the frame marker portion and the control channel portion of the training frame in a manner that bypasses the overhead process, the termination process, the Gray coding process, and the precoding process in the PMA sublayer.

24. A method for link training for a high-speed Ethernet link, comprising:
transmitting training frames from a transmit port to be received at a receive port; each training frame comprising a frame marker portion, a control channel portion, and a training pattern portion and employing four-level pulse amplitude modulation (PAM4) signaling including a low level signal, a first intermediate level signal, a second intermediate level signal, and a high level signal;
employing four-level signaling for the training pattern portion of the training frame, the four-level signaling including the low level signal, the first intermediate level signal, the second intermediate level signal, and the high level signal; and
employing only the low and high level signals for the frame marker and control channel portions of the training frame,
wherein the high-speed Ethernet link employs a Physical layer including a Physical Media Attachment (PMA) sublayer that is configured to perform a plurality of adaptation processes including an overhead insertion process, a termination process, a Gray coding process, a precoding process and a PAM4 encoding process, and wherein the control channel data corresponding to the control channel portion of the training frame is generated in a manner that bypasses the overhead process, the termination process, the Gray coding process, and the precoding process in the PMA sublayer.

25. The method of claim 24, further comprising:
employing at least a portion of cell fields in the control channel portion of the training frame that are compatible with the Institute of Electrical and Electronics Engineers (IEEE) 10GBASE-KR PHY specification.

26. The method of claim 24, wherein the control channel portion of the training frame includes a coefficient update portion and a status report portion, and wherein separate parity bits are employed for each of the coefficient update portion and the status report portion.

27. An apparatus including a high-speed Ethernet transmit port configured to perform operations when the apparatus is operating comprising:

transmitting training frames from the transmit port to be received at a receive port; each training frame comprising a frame marker portion, a control channel portion, and a training pattern portion and employing four-level pulse amplitude modulation (PAM4) signaling including a low level signal, a first intermediate level signal, a second intermediate level signal, and a high level signal;
employing four-level signaling for the training pattern portion of the training frame, the four-level signaling including the low level signal, the first intermediate level signal, the second intermediate level signal, and the high level signal; and
employing only the low and high level signals for the frame marker and control channel portions of the training frame,
wherein the high-speed Ethernet link employs a Physical layer including a Physical Media Attachment (PMA) sublayer that is configured to perform a plurality of adaptation processes including an overhead insertion process, a termination process, a Gray coding process, a precoding process and a PAM4 encoding process, and wherein the control channel data corresponding to the control channel portion of the training frame is generated in a manner that bypasses the overhead process, the termination process, the Gray coding process, and the precoding process in the PMA sublayer.

28. The apparatus of claim 27, wherein the high-speed Ethernet transmit port is configured to employ at least a portion of cell fields in the control channel portion of the training frame that are compatible with the Institute of Electrical and Electronics Engineers (IEEE) IEEE 10GBASE-KR PHY specification.

29. The apparatus of claim 27, wherein the high-speed Ethernet transmit port is configured to implement a multi-lane link including multiple lanes, and the Ethernet transmit port is further configured to transmit training frames over each of multiple lanes.

30. A system comprising:
a chassis;
an inter-plane, mounted within the chassis, having first and second inter-plane connectors and wiring coupled there between configured to facilitate a 100 Gigabits per second (Gbps) Ethernet link;
a first board having a first network interface controller (NIC) including 100 Gbps Ethernet transmit and receive ports operatively coupled to a first board connector that is coupled to the first inter-plane connector;
a second board having a second NIC including 100 Gbps Ethernet transmit and receive ports operatively coupled to a second board connector that is coupled to the second inter-plane connector,
wherein the 100 Gbps Ethernet transmit port of the first NIC is configured to perform operations when the apparatus is operating including,
transmitting training frames to be received at a receive port; each training frame comprising a frame marker portion, a control channel portion, and a training pattern portion and employing four-level pulse amplitude modulation (PAM4) signaling including a low level signal, a first intermediate level signal, a second intermediate level signal, and a high level signal;
employing four-level signaling for the training pattern portion of the training frame, the four-level signaling including the low level signal, the first intermediate level signal, the second intermediate level signal, and the high level signal; and employing only the low and high level signals for the frame marker and control channel portions of the training frame,
wherein the high-speed Ethernet link employs a Physical layer including a Physical Media Attachment (PMA) sublayer that is configured to perform a plurality of adaptation processes including an overhead insertion process, a termination process, a Gray coding process, a precoding process and a PAM4 encoding process, and
wherein the control channel data corresponding to the control channel portion of the training frame is generated in a manner that bypasses the overhead process, the termination process, the Gray coding process, and the precoding process in the PMA sublayer.

31. The system of claim 30, wherein the NIC is further configured to employ at least a portion of cell fields in the control channel portion of the training frame that are compatible with the Institute of Electrical and Electronics Engineers (IEEE) 10GBASE-KR PHY specification.

32. The system of claim 30, wherein the control channel portion of the training frame includes a coefficient update portion and a status report portion, and wherein separate parity bits are employed for each of the coefficient update portion and the status report portion.

* * * * *